(No Model.)
A. M. CHAVEZ.
CAR FENDER.
No. 556,619.  Patented Mar. 17, 1896.
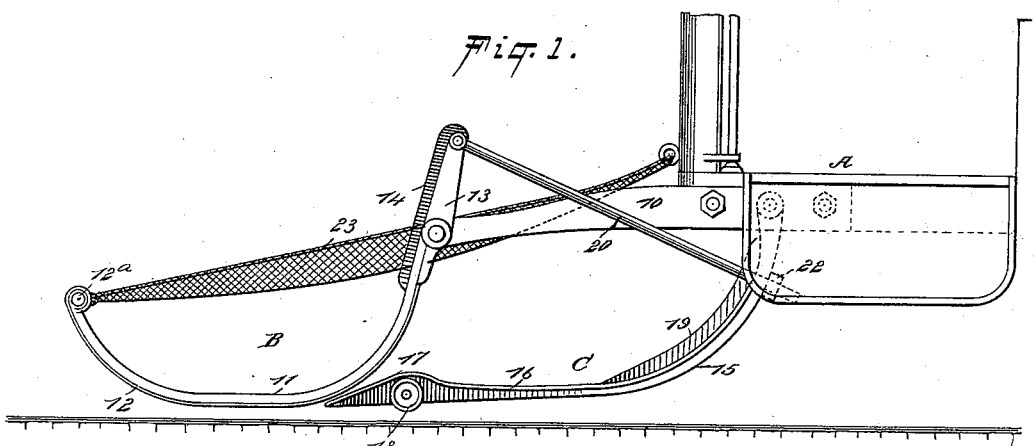
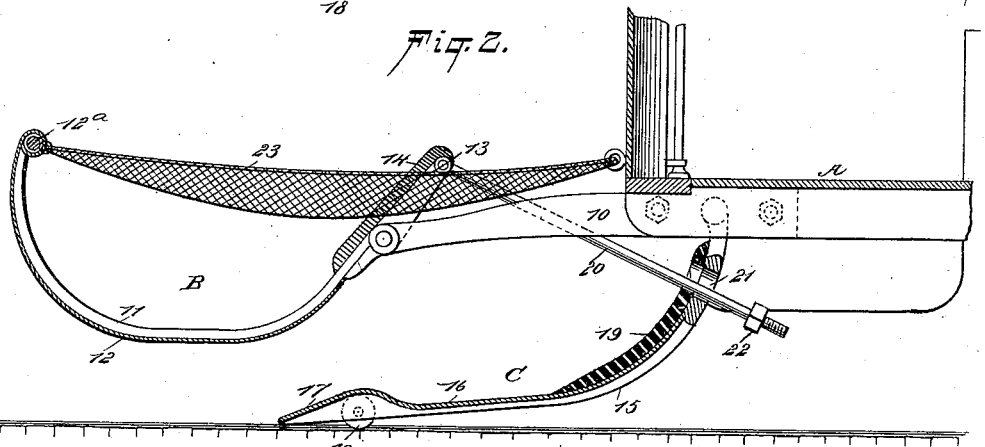
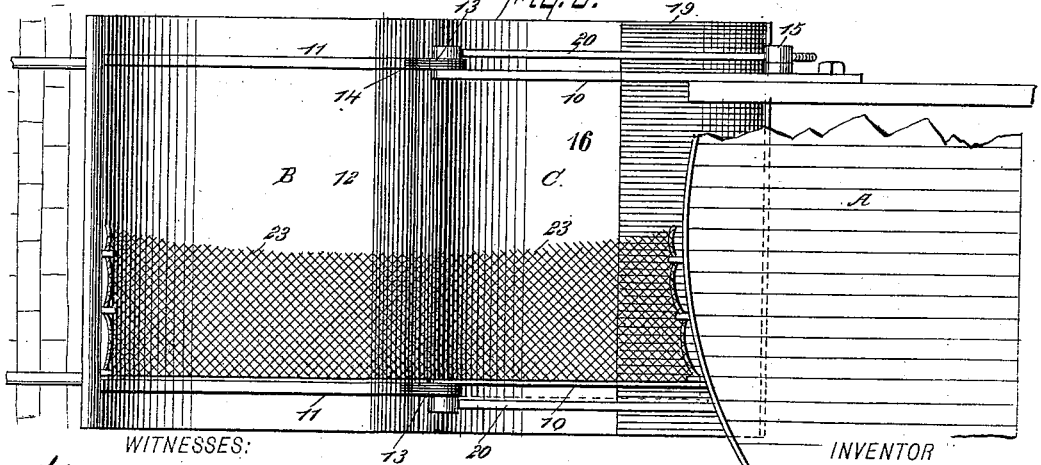

UNITED STATES PATENT OFFICE.

AGUSTIN M. CHAVEZ, OF MEXICO, MEXICO.

CAR-FENDER.

SPECIFICATION forming part of Letters Patent No. 556,619, dated March 17, 1896.

Application filed June 27, 1895. Serial No. 554,260. (No model.)

*To all whom it may concern:*

Be it known that I, AGUSTIN M. CHAVEZ, of the city of Mexico, Mexico, have invented a new and Improved Car-Fender, of which the following is a full, clear, and exact description.

My invention relates to an improvement in car-fenders, and the object of the invention is to provide a fender which will not only receive and rescue a person standing upright in the path of the car, but which will also as surely rescue a person lying on the ground or take up any object that may be on the ground in the path of the car and likely to serve as an obstruction.

A further object of the invention is to accomplish the above-named results by a construction adaptable to any car, and which will be exceedingly simple, durable and economic in its construction and thoroughly automatic in its action.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved fender attached to the front of a car, the fender being in its normal position. Fig. 2 is a longitudinal sectional view through the fender and through the platform of the car, illustrating the rear section of the fender in position to receive an object lying on the ground, the forward portion of the fender being elevated; and Fig. 3 is a plan view of the improved fender.

In carrying out the invention arms 10 are projected forwardly and usually slightly downwardly from the sides of the platform A of the car.

The fender is made in two substantially scoop sections B and C, the section B being the forward section and the section C the rear section. The receiving scoop-section B of the fender usually consists of bowed or upwardly-curved side bars 11 constituting the frame, and a body 12 of sheet metal or equivalent material, attached to the side bars of the frame at the bottom thereof and extending usually beyond the outer side faces of the said side bars, as shown in Fig. 3. The forward end of the forward or receiving scoop fender-section is provided with a front bar 12ª, around which the body is curled or curved, strengthening the fender-section at this point; and when this section of the fender is in its normal position the rear end is higher than the forward end, and the side bars 11 of the frame are pivoted in any approved manner to the arms 10 extending forwardly from the car-platform.

Extensions 13 are provided for the upper rear ends of the frame of the forward fender-section, normally extending upwardly and slightly rearwardly, as shown in Fig. 2, being covered upon their forward faces, as are likewise preferably the adjoining portions of the side bars 11, by a cushion 14 of any approved material.

The front section of the fender, while heretofore described as a scoop, is a scoop only in that its under face is more or less convexed, and said section may be more properly called the "receiving-section;" but the rear section C of the fender is in reality a scoop-section since it acts in the capacity of a scoop or shovel. This rear section C is constructed of side bars 15, serving as the frame thereof, and a body 16, of sheet metal or like material, secured to the upper faces of the side bars. The rear portion of this rear fender-section is curved in a decidedly upwardly and forwardly manner, the side bars being pivoted ordinarily to the side sills of the platform A of the car, or to an equivalent fixed support, and the lower or forward portion of the rear fender-section is but slightly curved, except at its forward extremity 17, where it is carried decidedly downward, and this edge is more or less beveled, so that it may lie close to the ground, and near the forward end of the rear fender-section the side bars are widened and the body is arched upward in order that friction rollers or wheels 18 may be journaled to the side bars to travel on the ground and support the lower portion of this section of the fender.

A cushion 19 of any approved material is made to cover the upper face of the body of the rear fender-section at the upper portion thereof, and connecting-rods 20 are pivoted to the extensions 13 of the forward fender-section and are carried downward and rearward through openings 21 in the rear fender-section near the pivot-points of the latter, being provided at their rear extremities with lock-nuts 22, or their equivalents.

The sections of the fender are practically made to balance one another, and the normal position of the forward or receiving section of the fender is slightly above the surface of the ground, and when in this position the connecting-rods are drawn forward by reason of the extensions of the forward sections of the fender being substantially vertical, and therefore the rear fender-section is likewise held above the surface of the ground, its forward or receiving end 17 being substantially in contact with the rear bottom portion of the forward or receiving section of the fender.

A bed 23, preferably of netting made from any suitable material, is secured to the front or cross bar 12ª of the forward fender-section and is carried rearward to an attachment to the dashboard of the car or to the forward end of the platform. Therefore this bed covers both of the sections of the fender, and, in operation, should a person be standing in the path of the car, upon being struck by the forward end of the forward fender-section, which may be cushioned, he will be received in the bed or net 23, as provided for by other fenders, and since there will be no obstruction to the bed yielding in a downwardly direction the person will not be injured upon landing on the said bed.

The prime feature of this invention consists in picking up objects that may lie on the ground and which could not be reached by the forward section of the fender and thrown into the bed. In such an emergency the forward or receiving fender-section would simply ride over the object—a child, for example—and as the sections are about equally balanced and the lower face of the forward section is smooth a child would not be injured by the passage of this forward section over it; but the forward section would be raised, and upon being elevated it will release the rear or scoop section, permitting its receiving end 17 to drop to the ground, whereupon the child will be practically shoveled up by this scoop-section and received upon its cushioned surface 19, thus preventing the child from being carried beneath the car and to the wheels.

It is obvious that this fender is thoroughly automatic in its action. It is exceedingly simple, comprising but three parts, the two sections proper and the bed, and that it provides for rescuing a person whether he be in an upright or in a reclining position.

Having thus described my invention, I claim as new and desire to secure by Letters Patent—

1. A car-fender, comprising two pivoted sections, a forward or receiving section and a rear scoop-like section, and a connection between the sections, said connection being secured to the front section and having a sliding movement in the rear section, substantially as described.

2. A car-fender, the same consisting of two pivoted sections, one being at the rear of the other, the forward section being the receiving-section and provided with a yielding bed and the rear section being of the character of a scoop, and a connecting-rod uniting the forward and rear sections and having play in one of them, the two sections being substantially balanced, whereby both are held normally above the surface of the ground, and whereby also when the forward section is raised the rear section will drop to the ground and receive upon it any object that may be in its path, as specified.

3. A car-fender, comprising a pivoted forward section provided with extensions at its rear end beyond its pivot, a pivoted scoop-like rear section, and rods pivoted to the extension of the forward section and having a sliding connection with the rear section, substantially as described.

4. In a car-fender, a receiving-section adapted for pivotal connection with a car, the said section being upwardly and forwardly curved and having extensions from its rear end, a scoop-section likewise adapted to be pivoted to the car and located at the rear of the forward section and beneath the same at its forward end, a bed attached to the receiving or forward section and adapted likewise for attachment to the car, and a connecting-rod pivoted to the extensions of the receiving-section of the fender and having sliding movement in the rear section, the said connecting-rod being adapted in one position of the forward fender-section to maintain the rear fender-section in an elevated position, and in a second position of the forward fender-section to permit the rear section to drop, as and for the purpose specified.

5. In a car-fender, the combination with a car-platform having forwardly-projecting arms, of a forward fender-section pivoted to the said arms and provided with upwardly-projecting extensions beyond its pivot, a bed secured to the forward end of the said section and to the dashboard of the car, a rear scoop-like fender-section pivoted to the car-platform and provided with apertures, and rods pivoted to the extensions of the forward section and having their rear ends projecting loosely through the apertures of the rear section and provided with stops on their ends, substantially as herein shown and described.

AGUSTIN M. CHAVEZ.

Witnesses:
J. FRED. ACKER,
C. SEDGWICK.